(12) United States Patent
Lidstrom et al.

(10) Patent No.: US 9,756,105 B2
(45) Date of Patent: Sep. 5, 2017

(54) METHOD AND ARRANGEMENT FOR CONTROLLING SESSIONS IN A COMMUNICATION NETWORK

(75) Inventors: Mattias Lidstrom, Stockholm (SE); Ignacio Mas Ivars, Tullinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1121 days.

(21) Appl. No.: 13/121,957

(22) PCT Filed: Oct. 2, 2008

(86) PCT No.: PCT/SE2008/051120
§ 371 (c)(1),
(2), (4) Date: Mar. 31, 2011

(87) PCT Pub. No.: WO2010/039073
PCT Pub. Date: Apr. 8, 2010

(65) Prior Publication Data
US 2011/0219134 A1    Sep. 8, 2011

(51) Int. Cl.
*H04L 29/06*    (2006.01)

(52) U.S. Cl.
CPC .......... *H04L 65/80* (2013.01); *H04L 65/1006* (2013.01); *H04L 65/1016* (2013.01); *H04L 65/1069* (2013.01); *H04L 69/24* (2013.01)

(58) Field of Classification Search
CPC ...................................................... H04L 29/06
USPC ......................................................... 709/229
See application file for complete search history.

(56) References Cited

U.S. PATENT DOCUMENTS

| | | | | |
|---|---|---|---|---|
| 7,685,295 B2* | 3/2010 | Myers et al. | ................. | 709/228 |
| 7,742,586 B1* | 6/2010 | Trandal et al. | .......... | 379/201.12 |
| 8,018,955 B2* | 9/2011 | Agarwal et al. | ............... | 370/401 |
| 8,271,657 B2* | 9/2012 | Eastham | ....................... | 709/227 |
| 2002/0118688 A1* | 8/2002 | Jagannathan | .................. | 370/410 |
| 2002/0165966 A1* | 11/2002 | Widegren et al. | ............. | 709/226 |
| 2004/0190453 A1* | 9/2004 | Rasanen et al. | .............. | 370/235 |
| 2012/0303795 A1* | 11/2012 | Mo et al. | ....................... | 709/224 |

FOREIGN PATENT DOCUMENTS

| | | |
|---|---|---|
| CN | 1972280 A | 5/2007 |
| WO | 2004/071105 A2 | 8/2004 |

* cited by examiner

*Primary Examiner* — Hassan Kizou
*Assistant Examiner* — Abdullahi Ahmed
(74) *Attorney, Agent, or Firm* — Patent Portfolio Builders, PLLC

(57) ABSTRACT

A method and an apparatus in a multimedia network node (312), for providing a relevant service level for a first subscriber (A) in a multimedia session with a second subscriber (B). A service level policy has been defined for each subscriber. A session negotiation message (3:1) sent by the first subscriber is first obtained. A required service level of the first subscriber is then detected from a service level parameter that the first subscriber has added to the negotiation message. The policy is updated (3:2a) for the second subscriber if the required service level cannot be allowed in the first subscriber's receive direction according to the original policy of the second subscriber, to allow that network resources are reserved (3:3) for the session such that the first subscriber will receive media (3:4) with the required service level.

11 Claims, 4 Drawing Sheets

METHOD AND ARRANGEMENT FOR CONTROLLING SESSIONS IN A COMMUNICATION NETWORK

TECHNICAL FIELD

The present invention relates generally to a method and arrangement for controlling communication sessions such that quality expectations of subscribers can be met more often.

BACKGROUND

A multitude of different communication terminals and devices have been developed for packet-based multimedia communication using IP (Internet Protocol), such as fixed or mobile computers and telephones. Multimedia services typically involve transmission of media in different formats and combinations. For example, a user terminal may exchange audio information as well as visual information with another user terminal, or may download or stream media in any format from a content server. Further, two user terminals may share multimedia content downloaded or streamed from a server, and so forth.

An architecture called "IP Multimedia Subsystem" (IMS) has been developed as a platform for enabling multimedia services and sessions, commonly referred to as an IMS network or IMS core. Thus, an IMS network can be used to initiate and control multimedia sessions for user terminals connected to different access networks. Although conceived primarily to enable multimedia services for mobile IP terminals, the IMS concept can be used by fixed IP terminals as well.

Multimedia sessions are handled by specific session control nodes in the IMS network including the node called P-CSCF (Proxy Call Session Control Function) acting as the entry point towards the IMS network for user terminals. An IMS network also includes a database node HSS (Home Subscriber Server) for storing various subscriber and authentication data, and may further include application servers for enabling various multimedia services.

The signalling protocol called "SIP" (Session Initiation Protocol) is commonly used for signalling various messages during setup of multimedia sessions in IMS networks. For example, a terminal typically sends a message called "SIP INVITE" to initiate a session with another terminal or a server, e.g. when a multimedia application has been invoked in the terminal. The SIP INVITE message triggers different actions in the IMS network and the access network for establishing the session, including reservation of appropriate network resources, which will be described in more detail later below.

In SIP, an additional protocol called "SDP" (Session Description Protocol) is used for specifying various parameters of a multimedia session, and an SDP message is typically embedded as a self-contained body within SIP messages. SDP messages are used to provide information on terminal capabilities and media properties, in order to specify and negotiate session parameters for multimedia sessions, which is well-known in the art. The term "session parameters" is used here to represent any terminal capabilities, media properties and address information necessary to establish a session. The above-mentioned SIP INVITE message and a common response message "SIP 200 OK" typically include an embedded SDP message with information on, e.g., one or more codecs (coders/decoders) proposed by the sender for the session.

A policy node associated with the used access network is also connected to the IMS network. The policy node is basically responsible for authorising sessions for terminals connected to the associated access network, and for controlling the network resource reservation for the sessions, based on various predetermined policies and subscription profiles. According to current terminology, the policy node generally operates according to a function called PCRF (Policy and Charging Rule Function). In particular, different QoS (Quality of Service) requirements can be controlled by the policy node for different services and/or subscribers which will determine the above resource reservation.

Many communication services thus require a certain QoS in order to provide a satisfying and expected result to subscribers. When establishing a communication session for a subscriber, various network resources are reserved for the session to provide a bearer of media data, preferably such that an acceptable and expected level of service is maintained for the subscriber, e.g. with respect to data bitrates and latency.

Today, differentiated services and subscriptions are commonly offered to subscribers such that they can consume services with different subscription types that typically dictate the QoS requirements for those services. Thus, subscribers may be offered specific service levels with respect to QoS for different subscription types and also for individual services. For example, using current terminology, a "Platinum" subscription may provide a relatively high warranted quality or service level, whereas "Gold", "Silver" and "Bronze" subscriptions provide successively lower service levels.

Moreover, specific services may also be offered with different service levels, e.g. at different prices. This differentiation of subscriptions, services and quality/service levels becomes increasingly significant and will thus influence the customer satisfaction and expectations to a great extent. For example, a Bronze subscriber might be satisfied to obtain a certain service level whereas a Platinum subscriber might not, expecting a higher service level.

When reserving network resources during setup of an IMS-controlled session, the above aspects of quality requirements must be considered, which is illustrated by the following example. In FIG. 1, a conventional session setup procedure is shown where a terminal A will communicate multimedia with another terminal B, e.g. using a wireless connection although the figure is generally also valid for fixed connections. Terminal A is connected to an access network in which a gateway node GW 100, e.g. GGSN (Gateway GPRS Switching Node) in a wireless access network, is used for data transport in the "bearer plane". Among other things, the IMS network includes a P-CSCF node 102 used for SIP-based control signalling with terminal A in the "control plane", and an AF (Application Function) 104 enabling the service used. In this example, terminal B is connected to another access network, not shown.

The gateway node GW 100 is connected to an associated policy node 106, here denoted PCRF, which is thus responsible for authorising communication sessions. The policy node 106 also controls resource reservation in the associated access network, as mentioned above, based on information stored in an SPR (Subscription Profile Repository) and a policy database, which are not shown here.

In a first step 1:1, terminal A obtains an initial connection and data bearer with the access network as established by the gateway node GW 100, e.g. involving the activation of a primary PDP context and a Radio Access Bearer RAB in the wireless connection case. The established connection and bearer are primarily used for carrying occasional control messages such as service requests, allowing for relatively low bandwidth and fairly long delays.

In a next step 1:2, GW 100 sends relevant access information to PCRF 106, including a subscription identifier and information on the connection and data bearer established in step 1:1. Thereby, a "state" is created in PCRF 106 for a "bearer session", meaning that the received access information is retained for terminal A in PCRF 106. A certain basic service level, typically a "best effort" level, has now also been established basically for communication of control messages using the obtained data bearer.

When a user activates a selected application in terminal A in order to communicate with terminal B in this case, a session negotiation is performed in a following step 1:3, which may involve the exchange of terminal capabilities with terminal B using the above SDP message. Terminal A starts the session negotiation by sending a SIP INVITE message towards terminal B, containing an SDP message with session parameters such as one or more proposed codecs for the session, referred to as an "SDP offer". Terminal B then responds with another SDP message, referred to as an "SDP answer", and the negotiation goes on until session parameters have been settled that both terminals are prepared to use.

After the session negotiation, the P-CSCF node 102 sends corresponding service information to PCRF 106, in a next step 1:4. Thereby, another state is created in PCRF 106 for a "service session", meaning that the received service information is retained. Moreover, PCRF 106 determines whether the requested session can be allowed or not by applying a suitable policy. In particular, it is checked which service level terminal A is entitled to during the forthcoming session, which may depend on the subscription type and/or service offerings from the network operator, both of which may be service-specific in different ways, e.g., depending on the time of day, week or season, and so forth.

If PCRF 106 can allow the requested session, i.e. according to the applied policy for the given subscriber and service and using the negotiated session parameters, an OK message is sent to the P-CSCF node 102 which also sends an OK message to the terminal A, as illustrated in a step 1:5. In order to satisfy QoS requirements according to the subscription and/or service offerings, appropriate network resources should now be reserved for the session, such as establishing a new data bearer. In this example, terminal A issues a bearer request for service data transport to GW 100, in a next step 1:6. Alternatively, the establishment of bearer may be initiated by the access network.

In a further step 1:7, GW 100 reserves network resources by establishing a suitable new bearer for the forthcoming data transport, e.g. involving the activation of a secondary PDP context and a new Radio Access Bearer RAB in the case of a wireless connection. GW 100 also sends relevant QoS information on the established connection and data bearer to PCRF 106 where the bearer session state is updated accordingly.

Hence, a service level with a certain QoS has now been established for the requested service, according to the negotiated session parameters and applied policy for the given subscriber and service. Likewise, network resources are established for terminal B as well, to create a service session and bearer of media data in the access network used by terminal B, based on a service level which terminal B is entitled to, which may be different from what terminal A has obtained.

Finally, after the individual service sessions of both terminals have been interconnected by the PCRF 106 in a binding operation, terminals A and B can execute the session, as illustrated by a final step 1:8. However, the data bearer established for terminal B by the opposite access network may provide a different service level depending on the subscription and/or service offerings of terminal B. In that case, data communicated between the two terminals A and B will be subject to different data bearers depending on the transport direction, where data sent from terminal A uses the bearer established for A and data sent from terminal B uses the bearer established for B. It should be noted that the above description of a conventional session setup procedure is greatly simplified by omitting details not necessary for understanding the present invention.

As mentioned above, subscribers consuming a communication service are often entitled to and may generally expect different service levels depending on their subscriptions and/or selected services. However, in order to achieve a certain service level and QoS in a multimedia session, the entire end-to-end path of media transport must share that service level. As can be seen from the example above, network resources are established in the respective access networks which may provide data bearers with different capacities for two communicating parties, if differentiated service levels are employed. In that case, it is known that a "least common denominator" with respect to data rates and codecs can be negotiated between two terminals A and B, by utilising the above-described SIP-embedded SDP offer/answer model as follows.

An SDP offer in a SIP INVITE message from terminal A can carry preconditions requiring that certain end-to-end characteristics are fulfilled before the media path can be established successfully. This SDP offer may be configured with optional session attributes "a" as follows:

SDP (SIP INVITE from A):
m=audio 20002 RTP/AVP 0
c=IN IP4 192.0.2.1
a=curr:qos e2e none
a=des:qos mandatory e2e sendrecv This SDP offer specifies a proposed audio codec "m", an IP address "c", and two session attributes "a" with network resource parameters, the first one indicating that no end-to-end QoS resources are currently reserved, and the second one indicating that a certain desired end-to-end QoS is required ("mandatory") in both path directions ("sendrecv").

Network resources are then reserved for the receiving terminal B in its send direction, i.e. from B to A, and terminal B sends a response SIP 200 OK containing an SDP answer that may be configured as follows:

SDP (SIP 200 OK from B):
m=audio 30000 RTP/AVP 0
c=IN IP4 192.0.2.4
a=curr:qos e2e none
a=des:qos mandatory e2e sendrecv
a=conf:qos e2e recv In this SDP answer, a third session attribute "a" has been added confirming that network resources have been reserved in a direction from B to A ("recv"), providing a certain end-to-end QoS that terminal B is entitled to obtain. Terminal B then waits for another SDP offer from A with a confirmation of reserved network resources in the opposite direction from A to B. This SDP negotiation continues until required network resources have been reserved for both directions.

However, terminal A will then receive data during the session over a data bearer providing a QoS to which terminal B is entitled, and vice versa. For example, if terminal A uses a platinum subscription and terminal B uses a bronze subscription, terminal A will receive data over B's data bearer which provides a service level that is lower than the expected service level according to the platinum subscription.

It is therefore a problem that a premium subscriber, entitled to and expecting a relatively high service level, may experience a service level that is lower than expected when communicating with a non-premium subscriber, due to the above differentiation of services and/or subscribers. The premium subscriber will thus not be able to utilise the service with a corresponding premium quality.

SUMMARY

It is an object of the present invention to address the problems outlined above. In particular, it is an object to enable subscribers to consume communication services with a service level that is relevant to their subscriptions, even when involved in sessions with subscribers using subscriptions that only permit relatively lower service levels. These objects and others can be obtained by providing a method and an arrangement according to the independent claims attached below.

According to one aspect, the invention involves a method in a multimedia network node of providing a relevant service level for a first subscriber when participating in a multimedia session with a second subscriber. It is assumed that a policy dictating a service level has been defined for each participating subscriber. First, a session negotiation message sent by the first subscriber, is obtained, and a required service level of the first subscriber is detected from a service level parameter that has been added by the first subscriber to the obtained negotiation message. If the required service level of the first subscriber cannot be fulfilled in the first subscriber's receive direction according to the original policy of the second subscriber, the policy for the second subscriber is updated to allow that network resources are reserved for the session such that the first subscriber will receive media with the required service level.

According to another aspect, the invention involves an apparatus in a multimedia network node for providing a relevant service level for the first subscriber when participating in the multimedia session above. The inventive apparatus comprises a negotiation information obtaining unit adapted to obtain a session negotiation message sent by the first subscriber, and a service level detecting unit adapted to detect a required service level of the first subscriber from a service level parameter that has been added by the first subscriber to the negotiation message. The apparatus further comprises a policy updating unit adapted to update the policy for the second subscriber if the required service level of the first subscriber cannot be fulfilled in the first subscriber's receive direction according to the original policy of the second subscriber, to allow that network resources are reserved for the session such that the first subscriber will receive media with said required service level.

The invented method and apparatus may be implemented according to any of the following optional embodiments. In one embodiment, the policy of the second subscriber is updated to enable an asynchronous session. In another embodiment, a required service level of each participating subscriber can be detected by interpreting negotiation messages exchanged between the subscribers containing a service level parameter indicating a required service level, which parameter has been added to at least one negotiation message by each subscriber. The negotiation messages may include SPD offerings and SPD answers.

The subscribers participating in the session may be entitled to different service levels due to differentiated subscriptions and/or service offerings. For example, the first subscriber may be entitled to a relatively high service level and the second subscriber may be entitled to a relatively lower service level. In that case, the policy of the second subscriber is updated to allow for the high service level in a media transport direction from the second subscriber to the first subscriber. The policy for the first subscriber could also be updated to only allow that network resources are reserved for the session such that the second subscriber will receive media with the relatively lower service level.

In another embodiment, the policy or policies above is/are updated by temporarily changing data for the corresponding subscriber in a policy database and/or in a subscription profile repository, to be valid during said multimedia session. The multimedia network node may be a P-CSCF node in an IMS network, or any corresponding node in a similar multimedia services network.

In another embodiment, the apparatus above further comprises a determining unit adapted to determine whether the subscribers require different service levels, to enable an asynchronous session if the subscribers require different service levels.

Further features of the present invention and its benefits will be explained in the detailed description below.

BRIEF DESCRIPTION OF THE DRAWINGS

The present invention will now be described in more detail by means of preferred embodiments and with reference to the accompanying drawings, in which.

DETAILED DESCRIPTION

Figure 1:
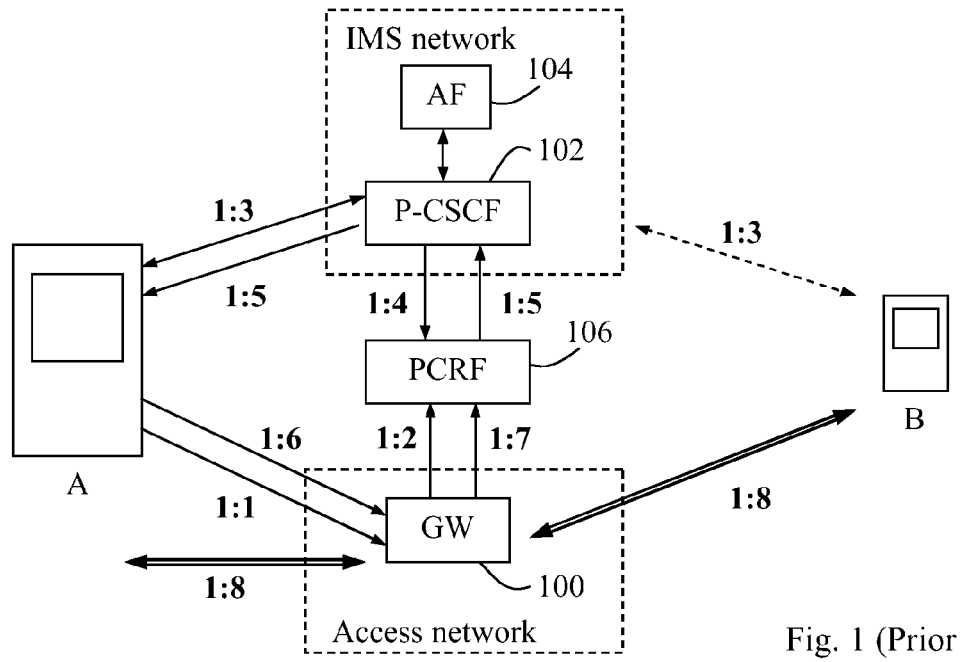
FIG. 1 illustrates a conventional procedure for establishing a session between two terminals A and B using a policy node PCRF, according to the prior art.

In the following examples, it is assumed that a multimedia services network, e.g. an IMS network, is used for providing a multimedia service, and that at least two subscribers are involved in a multimedia session connected to respective access networks in which network resources must be reserved for media transport. However, the present invention is not limited to two subscribers but can be utilised for three or more subscribers, although a session negotiation may be needed for each subscriber pair or a common session controller may cater for the session negotiations. Further, the participating subscribers may be connected to different separate access networks or to the same access network.

Briefly described, the present invention enables multimedia sessions involving subscribers that may be entitled to different service levels, where network resources are reserved in the access networks for receiving media according to the different required service levels of the respective subscribers. If it is detected that a first subscriber entitled to a certain service level is involved in a session setup procedure with a second subscriber entitled to a relatively lower service level, an original policy for resource reservation on behalf of the second subscriber is updated for the session to temporarily upgrade the service level of the second subscriber, in order to meet the first subscriber's higher expectations of service level during the session. Likewise, the original policy for the first subscriber may also be updated to only allow that network resources are reserved for the session such that the second subscriber will receive media with the relatively lower service level, which the second subscriber is entitled to. Thereby, an asynchronous session in terms of session levels and network resources may be established, although the present invention is generally not limited to asynchronous sessions.

Network resources in a media transport direction from the first subscriber to the second subscriber can thus be reserved to provide the relatively lower service level, i.e. according to expectations of the second subscriber, whereas network resources in the opposite direction from the second subscriber to the first subscriber are reserved to satisfy the expectations of a relatively higher service level of the first subscriber, as allowed by the updated policy. As a result, the session and its media transport will then be asynchronous with respect to service level, e.g. data rate, reliability, quality, latency, etc., such that the first and second subscribers will receive media with different service levels. It should be noted that the service level can basically be perceived mainly when receiving media.

The features above can be achieved by introducing an additional parameter in the above-described session negotiation process, indicating a required service level of each subscriber, e.g. Platinum or Bronze, which will enable detection of mutually different warranted service levels of the two subscribers in the multimedia network. The subscribers may include this additional service level parameter in the above-described SDP offers and answers, respectively, which will be described in more detail below. However, the present invention is not limited to using the SDP protocol specifically, but any other similar or corresponding session negotiation protocol can be utilised in the manner to be described below.

In the following exemplary embodiments, a subscriber entitled to a relatively low service level will sometimes be referred to as a "Bronze subscriber", whereas a subscriber entitled to a relatively higher service level will be referred to as a "Platinum subscriber" for simplicity, to represent subscribers with any mutually different service levels. However, the present invention is generally applicable whenever two subscribers are entitled to different service levels, e.g. due to differentiated subscriptions and/or service offerings as described above, without limitation to the specific service levels of Bronze and Platinum. Further, the term "subscriber" generally represents an end-user and his/her communication equipment used when establishing and executing services in the manner described herein, e.g. by means of a UA (User Agent) or the like implemented in a user terminal.

Figure 2:
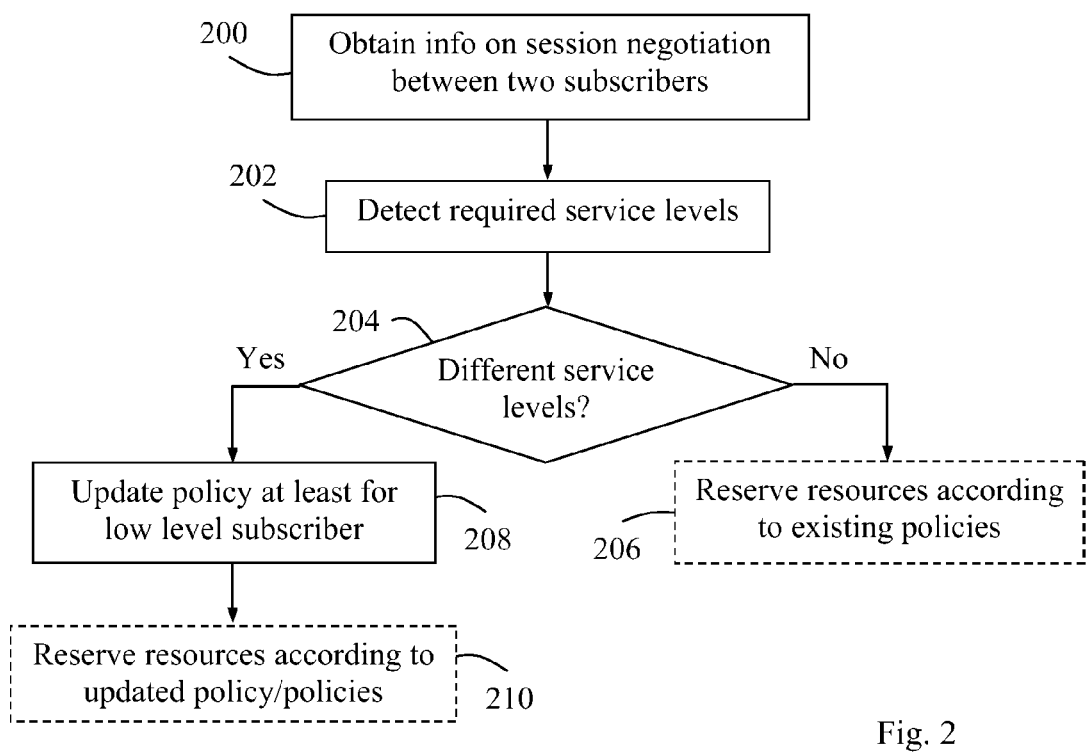
FIG. 2 is a flow chart illustrating a procedure for providing relevant service levels for subscribers in a media session, according to one embodiment.

FIG. 2 is a flow chart illustrating a basic procedure in a multimedia network node for providing relevant service levels for two subscribers requiring mutually different service levels in a multimedia session, according to one exemplary embodiment. The shown procedure can be implemented basically in any "resource aware" node in a multimedia services network, e.g. a P-CSCF node in an IMS network. If not indicated otherwise, it is assumed that the following steps are executed by a novel logic function denoted "SLI (Service Level Interpreter)" that may for example reside in the P-CSCF node or be connected thereto.

In a first step 200, information is obtained regarding a session negotiation between the two subscribers, e.g. by interpreting negotiation messages exchanged between the subscribers during a session setup procedure, such as SDP offerings and answers, containing the above-mentioned additional parameter indicating a required service level. In a next step 202, the service level required by each subscriber is detected from the service level parameters present in the exchanged negotiation messages.

It is then determined in a following step 204 whether the subscribers require different service levels, e.g. Bronze and Platinum, respectively. If the subscribers are entitled to the same service level, a synchronous session can be executed to satisfy their expectations, and a step 206 indicates that network resources are reserved according to the existing equal policies of the subscribers, resulting in a synchronous session in a conventional manner. This step, shown as a dashed box, is basically executed in the respective access networks based on policies that have been defined for the subscribers, e.g. as described in connection with step 1:7 in FIG. 1 above.

On the other hand, if it is found in step 204 that the subscribers require mutually different service levels, one "higher" than the other, the policy for at least the low service level subscriber is updated in a step 208, to temporarily allow for a higher service level in the send direction of that subscriber. Thereby, the opposite high service level subscriber will receive media with his/her warranted service level. It is also possible to directly update a resource reservation already made for the low service level subscriber in a session database or the like, to upgrade the service level for the high service level subscriber.

Optionally, the policy for the high service level subscriber may also be updated, i.e. downgraded, to provide the lower service level in the send direction of that subscriber. Thereby, the opposite low service level subscriber will receive media with his/her warranted lower service level in an asynchronous session. However, it may not be necessary or required to downgrade the service level for the low service level subscriber, depending on the implementation. In that case, the session may well become synchronous, but not due to the above-mentioned least common denominator approach in this case.

Thanks to the updated policy/policies, an session can be executed to satisfy the different expectations of both subscribers, i.e. with their respective warranted service levels in the receive direction, resulting in an asynchronous session in this example. A step 210 thus indicates that network resources are reserved according to the updated policy/policies, which is basically executed in the respective access networks of the subscribers, therefore shown as a dashed box.

Figure 3:
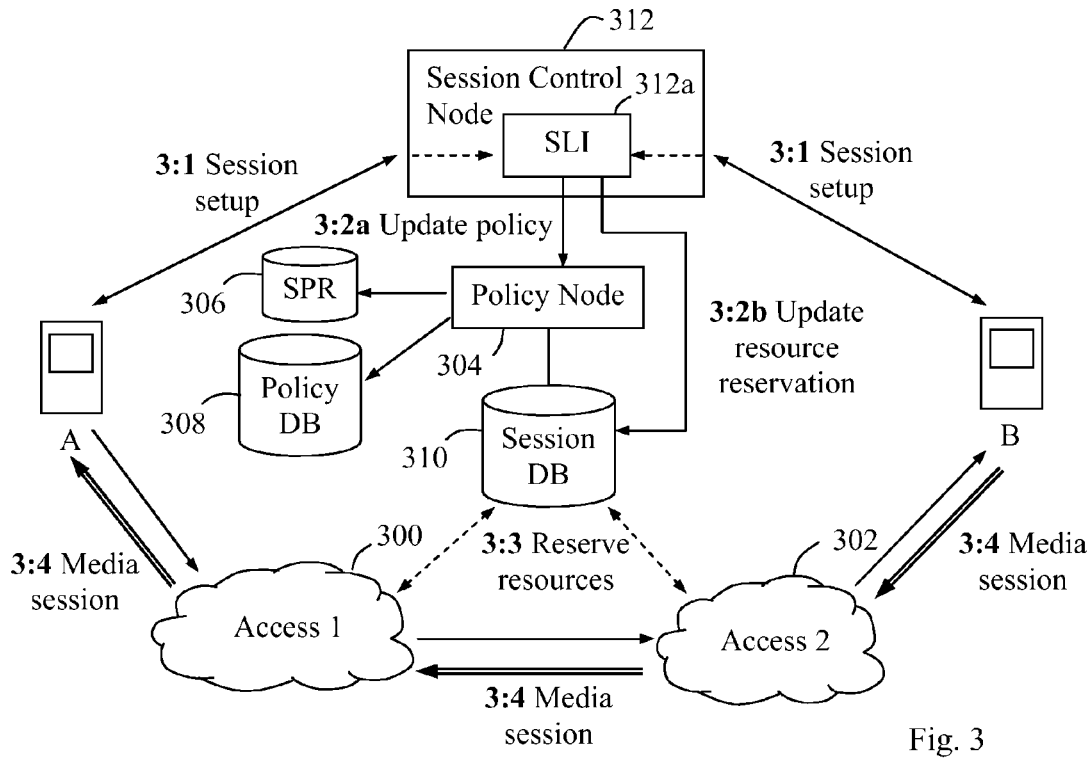
FIG. 3 is a block diagram illustrating a network scenario in which the present invention can be implemented, according to further embodiments.

FIG. 3 illustrates a communication scenario where an asynchronous multimedia session is established for a Platinum subscriber A and a Bronze subscriber B, according to further exemplary embodiments. Subscribers A and B are connected to different access networks 300 and 302, respectively, while network resources in each access network 300, 302 are reserved for sessions based on policies controlled by a policy node 304, e.g. a PCRF node. An SPR (Subscription Profile Repository) 306 holds subscription data for different subscribers and various policies for the subscribers are stored in a policy database 308. Further, information on network resources being currently reserved for different sessions is stored in a session database 310. A conventional process of reserving network resources based on subscriber policies and subscription profiles has been generally described above with reference to FIG. 1.

A first stage 3:1 illustrates that a session setup procedure is conducted, involving the exchange of SDP messages in a session negotiation between the subscribers A and B over a session control node 312 in an IMS network. In practice, subscribers A and B are typically served by different session control nodes and possibly also by different multimedia services networks, although not shown here for simplicity.

The session control node 312 comprises an SLI function 312a which obtains information on the session negotiation, including detection of the above-described service level parameter that each subscriber includes in their SDP offers and answers, respectively. In this case, the SLI function 312a detects that subscriber A requires the Platinum service level and that subscriber B requires the Bronze service level.

In order to establish a multimedia session that will satisfy the different expectations of both subscribers, the SLI function 312a may send a policy update instruction to the policy node 304, in a stage 3:2a, which then accordingly updates the policy in policy database 308 for subscriber B. More specifically, the policy of subscriber B is upgraded from Bronze to Platinum in the send direction, in order to meet subscriber A's expectations when receiving media from subscriber B. In the same way, the policy of subscriber A can be downgraded from Platinum to Bronze in the send direction, thus allowing for an asynchronous session. Thereby, a network resource reservation can be made for the session in networks 300, 302 which is also stored in session database 310, as schematically shown by a stage 3:3.

Finally, a stage 3:4 illustrates that an asynchronous media session is executed, using the reserved network resources with the Bronze service level in a direction from A to B, shown by slim arrows, and the Platinum service level in a direction from B to A, shown by fat arrows.

Figure 4:
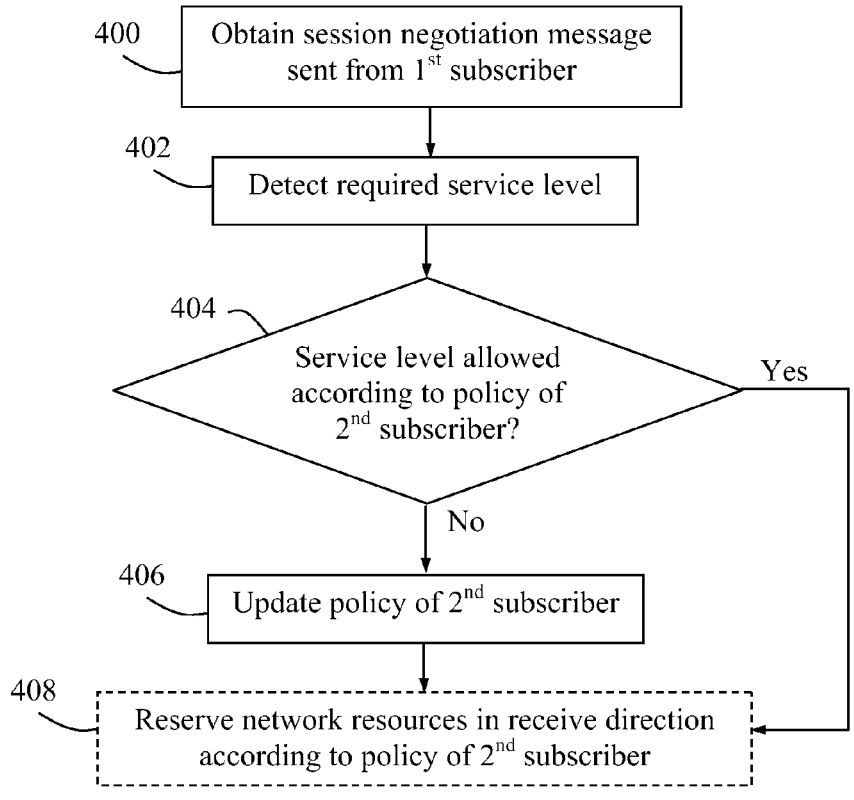
FIG. 4 is a flow chart illustrating a procedure for providing a relevant service level for a first subscriber in a media session with a second subscriber, according to another embodiment.

FIG. 4 is a flow chart illustrating a procedure in a multimedia network node for providing a relevant and expected service level for a first subscriber in a multimedia session with a second subscriber, according to another exemplary embodiment slightly different from the one described with reference to the flow chart in FIG. 2. However, the procedures in FIGS. 2 and 4 are not mutually exclusive, and both can basically be executed in parallel.

In a first step 400, a session negotiation message is received from the first subscriber, e.g. an SDP message, which includes a service level parameter indicating a required or desired service level, that has been added by the first subscriber. In a next step 402, the service level required by the first subscriber is detected from the service level parameter in the received negotiation message.

It is then determined in a following step 404 whether the required service level can be allowed in the first subscriber's receive direction according to a policy of the second subscriber. If not, the policy of the second subscriber is updated in a next step 406, to temporarily allow for the required service level in the send direction of the second subscriber, i.e. the first subscriber's receive direction. A final step 408 illustrates that network resources are reserved in the first subscriber's receive direction according to the current policy of the second subscriber such that the first subscriber will receive media with his/her required or warranted service level. If the required service level can be allowed in step 404, step 406 can be omitted as indicated in the figure.

It will now be described in more detail how the session negotiation messages can be configured and utilised, according to further exemplary embodiments, when SIP and SDP are used for such negotiation between a Bronze subscriber and a Platinum subscriber. As described above, the subscribers insert an additional service level parameter in their SDP offers and answers to indicate a required or desired service level.

In this example, the Platinum subscriber starts the negotiation by sending an SDP offer, embedded in a SIP INVITE message, with conventional media attribute lines as in the prior art examples described above. The SDP offer also includes the additional service level parameter of Platinum as an end-to-end service level requirement, as follows:

SDP1 (SIP INVITE from A):
m=audio 20002 RTP/AVP 0
c=IN IP4 192.0.2.1
a=curr:qos e2e none
a=des:qos mandatory e2e sendrecv platinum It is assumed that subscriber B uses a reservation protocol called RSVP (Resource Reservation Protocol) typically used for conveying reservation information from the access network to subscribers. However, subscriber B may use any other suitable reservation protocol and the present invention is basically not limited in this respect. In this way, subscriber B will be informed when resources in its send direction becomes available, i.e. reserved. However, B does not know the status of reservations in its receive direction. B therefore requests a confirmation for resource reservations in the "recv" direction in an SDP answer to the opposite subscriber A.

The SDP answer from B to A also includes the additional service level parameter of Bronze as an end-to-end service level requirement of subscriber B, as follows:

SDP2 (SIP 200 OK from B):
m=audio 30000 RTP/AVP 0
c=IN IP4 192.0.2.4
a=curr:qos e2e none
a=des:qos mandatory e2e sendrecv bronze
a=conf:qos e2e recv The information on requested service levels of subscribers A and B in either direction, as indicated by the service level parameters in the above SDP messages, is somehow conveyed to a policy node, e.g. PCRF, e.g. as in stage 3:2a or stage 3:2b in FIG. 3. This can thus be done in different ways as follows:

1) Information on requested network resources normally communicated over an Rx interface between a used P-CSCF node and a PCRF node, can be modified to include this extra information. The AF used can then receive this SDP information from the P-CSCF node which simply forwards the SIP message to AF, whereupon AF returns the SIP message back to the P-CSCF node.

2) The service level parameters of A and B are somehow detected by the above-described SLI function depending on the implementation, e.g. by receiving this information from a P-CSCF node. The SLI function can then send the required service levels directly to the policy node as a policy update instruction, e.g. in a dedicated message, which will be stored in the session database. This will thus allow the policy node to operate as normal in the session setup procedure, e.g.

binding the session between the control plane and the bearer or traffic plane using the externally updated session information.

3) The SLI function can alternatively send the policy update instruction to the policy node using extensions in an existing Rx interface protocol, which is typically the protocol called Diameter.

After having sent the SDP answer above, subscriber B will initiate resource reservation for the upcoming media session. Likewise, when subscriber A receives the SDP answer from B, resource reservation for A will be initiated as well.

In due course, subscriber B will be confirmed of the reservation made for the send direction, by the fact that the SDP negotiation has been completed successfully. However, B will wait until resources in the opposite receive direction have been reserved as well since B has not obtained any confirmation at this point and the service level requirements have not yet been met.

When subscriber A receives reservation messages from its network, A sends an updated SDP offer in a SIP update message to subscriber B as follows:

SDP3 (SIP UPDATE from A):
m=audio 20002 RTP/AVP 0
c=IN IP4 192.0.2.1
a=curr:qos e2e send platinum
a=des:qos mandatory e2e sendrecv In response thereto, subscriber B sends an SDP answer in a response to the SIP update message back to A, which contains the current status of the reservation in the send direction as follows:

SDP4 (SIP 200 OK from B):
m=audio 30000 RTP/AVP 0
c=IN IP4 192.0.2.4
a=curr:qos e2e sendrecv bronze
a=des:qos mandatory e2e sendrecv At this point, the session establishment can be resumed and B will eventually return a "180 response" or similar message to A, meaning that the user at B is alerted by a ring tone or the like. A network connection between subscribers A and B has now been established with reserved network resources providing the Platinum service level in the path from B to A and providing the Bronze service level in the opposite path from A to B.

Figure 5:
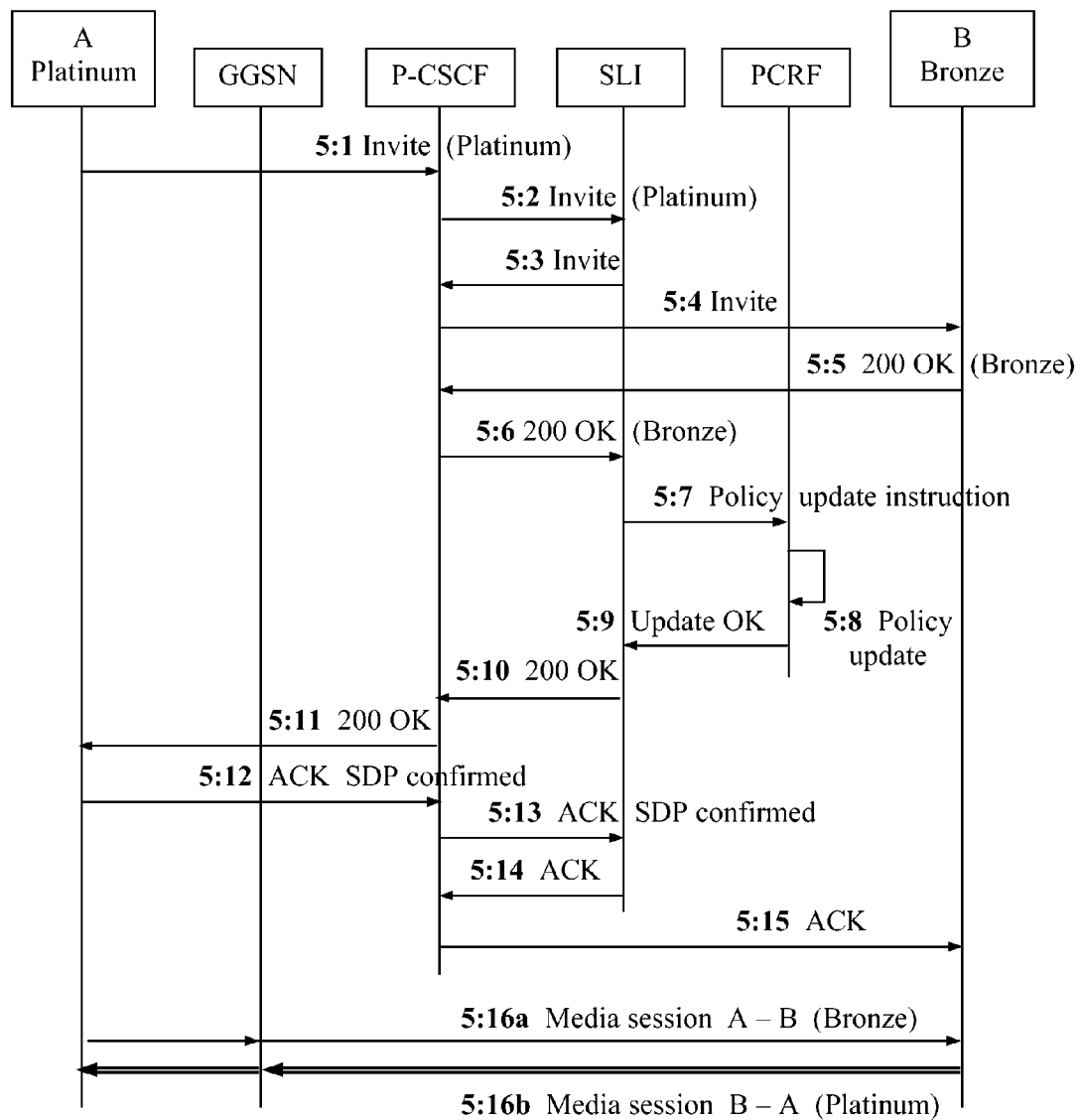
FIG. 5 is a signalling diagram illustrating a procedure for establishing a media session for a Platinum subscriber A and a Bronze subscriber B, according to yet another embodiment.

FIG. 5 illustrates an exemplary signalling diagram that can be used when implementing a procedure for establishing appropriate network resources for an asynchronous session between a Platinum subscriber A and a Bronze subscriber B, e.g. using the latter example of SDP negotiation described above. The illustrated procedure further involves a gateway node GGSN in a mobile access network used by A, a P-CSCF node in an IMS network serving at least subscriber A, an SLI function which is regarded as a separate node in this illustration, and a PCRF node for policy control.

It is assumed that a network connection, involving a primary PDP context and a corresponding RAB, has been established for subscriber A before the following steps. In a first step 5:1, a SIP invite containing an SDP offer, configured with a service level indication of Platinum according to SDP1 in the foregoing example above, is sent from A towards B, which is first received by the P-CSCF node. In a next step 5:2, the SIP invite is forwarded from P-CSCF to the SLI function which then detects the service level indication and marks A as Platinum. In a further step 5:3, the SIP invite is returned from SLI to P-CSCF, which sends the message to B in a following step 5:4.

Next, B responds by sending a SIP 200 OK message towards A, containing an SDP answer configured with a service level indication of Bronze according to SDP2 above, which is received by the P-CSCF node in a step 5:5. The 200 OK message is then forwarded from P-CSCF to SLI, in a following step 5:6, which detects the service level indication and marks B as Bronze. Now SLI knows that the media transport direction towards A should be platinum and towards B should be bronze.

Hence, the service level allowed by the original policy of subscriber B will not satisfy expectations of subscriber A when media is communicated from B to A, and it can basically be concluded that the two subscribers have different service levels. Therefore, the SLI function now sends a policy update instruction, in a next step 5:7, to the PCRF node which then accordingly updates the policy for subscribers B and A in their respective send directions, in a further step 5:8. A notification is then sent to the P-CSCF node, in a step 5:9, that the policy update has been successfully executed by the PCRF node.

In a further step 5:10, SLI returns the 200 OK message to P-CSCF, which then accordingly sends the message over to A in a next step 5:11, as a response to the initial Invite message of step 5:1. Thereafter, A sends an acknowledging message ACK (to the SIP INVITE) with the SDP confirmed according to SDP3 above, to P-CSCF in a step 5:12. In this example, P-CSCF forwards the ACK message to SLI in a step 5:13 for routing consistency, which can check that SDP3 is correct and contains what has been updated by the PCRF, which then returns the ACK message back to P-CSCF in a following step 5:14, for continued routing. Finally, the ACK message is sent from P-CSCF to B in a step 5:15, which completes the negotiation.

At that point, subscribers A and B are ready to execute the media session and network resources can be reserved according to conventional procedures, not shown here for simplicity, to cater for an asynchronous session which is illustrated by a final combined step 5:16a, 5:16b. More precisely, the session is divided into a session path from A to B providing the Bronze service level (5:16a) and a session path from B to A providing the Platinum service level (5:16b), in accordance with expectations of the respective subscribers and their warranted service levels.

It should be noted that several messages and operations have been omitted in FIG. 5 which are not necessary to describe here in detail to understand the present embodiment, such as the above-mentioned resource reservation and binding operation for interconnecting individual service sessions of the subscribers A and B.

Figure 6:
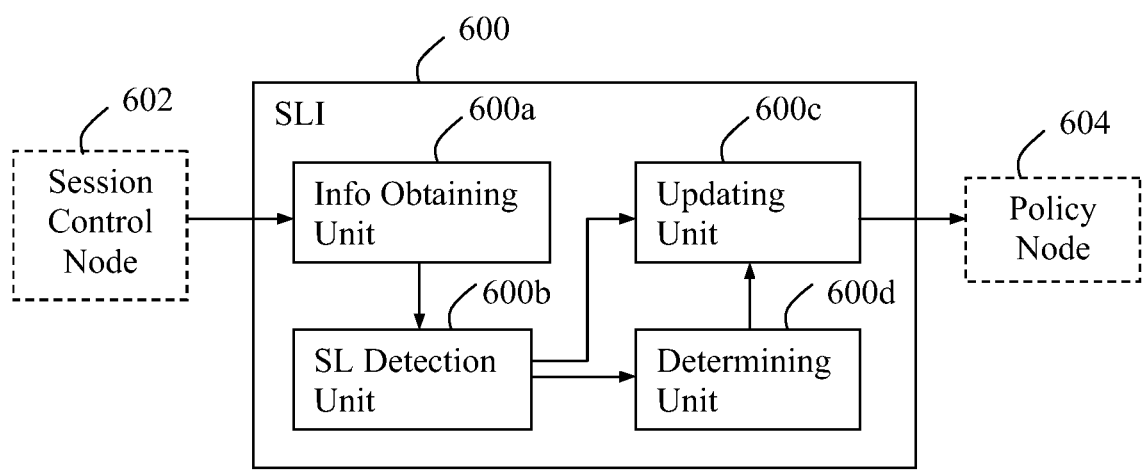
FIG. 6 is a block diagram illustrating in more detail an apparatus in a multimedia network node, according to yet another embodiment.

FIG. 6 is a block diagram illustrating a service level interpreter SLI 600 in more detail, for providing relevant service levels for a first subscriber participating in a multimedia session with a second subscriber, wherein a policy dictating a service level has been defined for each participating subscriber, according to further embodiments. The SLI 600 is basically implemented as an apparatus in a multimedia network node.

The SLI 600 comprises a negotiation information obtaining unit 600a adapted to obtain information on a session negotiation between the subscribers from a session control node 602, and a service level detecting unit 600b adapted to detect a required service level of the first subscriber from a service level parameter that has been added by the first subscriber to said negotiation message.

The SLI 600 further comprises a policy updating unit 600c adapted to update the policy for the second subscriber if the required service level of the first subscriber cannot be allowed in the first subscriber's receive direction according to the original policy of the second subscriber, to allow that network resources are reserved for the session such that the first subscriber will receive media with said required service level.

The SLI 600 may further comprise a determining unit 600*d* adapted to determine whether the subscribers require different service levels. In that case, the policy updating unit is further adapted to update the policy to enable an asynchronous session if the subscribers require different service levels.

By implementing the present invention, subscribers can be allowed to take full advantage of their subscriptions and enjoy their entitled service levels when communicating multimedia with other subscribers not having the same service levels. Furthermore, asynchronous sessions are also enabled to provide more relevant service levels for subscribers.

While the invention has been described with reference to specific exemplary embodiments, the description is in general only intended to illustrate the inventive concept and should not be taken as limiting the scope of the invention. For example, the SIP signalling protocol and IMS concept have been used throughout when describing the above embodiments, although any other standards and service networks may basically be used. The present invention is defined by the appended claims.

The invention claimed is:

1. A multimedia network node configured to provide a relevant service level for a first subscriber participating in a multimedia session with a second subscriber, wherein a policy defined for each subscriber entitles that subscriber to a certain service level, the multimedia network node comprising:
   a negotiation information obtaining circuit configured to obtain a session negotiation message sent by the first subscriber,
   a service level detecting circuit configured to detect a required service level of the first subscriber from a service level parameter that has been added by the first subscriber to said session negotiation message, and
   a policy updating circuit configured, if the required service level of the first subscriber cannot be fulfilled in a receive direction of the first subscriber according to the policy defined for the second subscriber, to update that policy to allow reservation of network resources appropriate for the first subscriber to receive media during the multimedia session with the required service level of the first subscriber.

2. The multimedia network node according to claim 1, further comprising a determining circuit configured to determine whether the first and second subscribers require different service levels, and wherein the policy updating circuit is further configured, if the subscribers require different service levels, to update one or more of said policies to enable an asynchronous session.

3. The multimedia network node according to claim 1, wherein the negotiation information obtaining circuit is further configured to obtain a session negotiation message sent by the second subscriber, and wherein the service level detecting circuit is further configured to detect a required service level of the second subscriber from a service level parameter that has been added by the second subscriber to the session negotiation message sent by the second subscriber.

4. The multimedia network node according to claim 3, wherein the session negotiation messages include Session Description Protocol (SDP) offerings and SDP answers.

5. The multimedia network node according to claim 1, wherein the first and second subscribers are entitled to different service levels due to at least one of differentiated subscriptions and differentiated service offerings.

6. The multimedia network node according to claim 1, wherein the first subscriber is entitled to a relatively high service level and the second subscriber is entitled to a relatively low service level, and wherein the policy updating circuit is configured to update the policy defined for the second subscriber to allow for said relatively high service level in a media transport direction from the second subscriber to the first subscriber.

7. The multimedia network node according to claim 6, wherein the policy updating circuit is further configured to update the policy defined for the first subscriber to allow reservation of network resources appropriate for the second subscriber to receive media during the multimedia session with said relatively low service level.

8. The multimedia network node according to claim 7, wherein the policy updating circuit is configured to update the policy defined for the first subscriber by temporarily changing data for the first subscriber in at least one of a policy database and a subscription profile repository, to be valid during the multimedia session.

9. The multimedia network node according to claim 1, wherein the policy updating circuit is configured to update the policy defined for the second subscriber by temporarily changing data for the second subscriber in at least one of a policy database and a subscription profile repository, to be valid during the multimedia session.

10. The multimedia network node according to claim 1, wherein the multimedia network node is a Proxy Call Session Control Function (P-CSCF) node in an IP Multimedia Subsystem (IMS) network.

11. The multimedia network node according to claim 1, wherein the required service level of the first subscriber comprises a defined data rate, a defined media codec, or both with which the first subscriber receives media.

* * * * *